Sheet 1. 2 Sheets
8148½X
J. Chester
Rope Mach.
Patented Apr. 16, 1834.
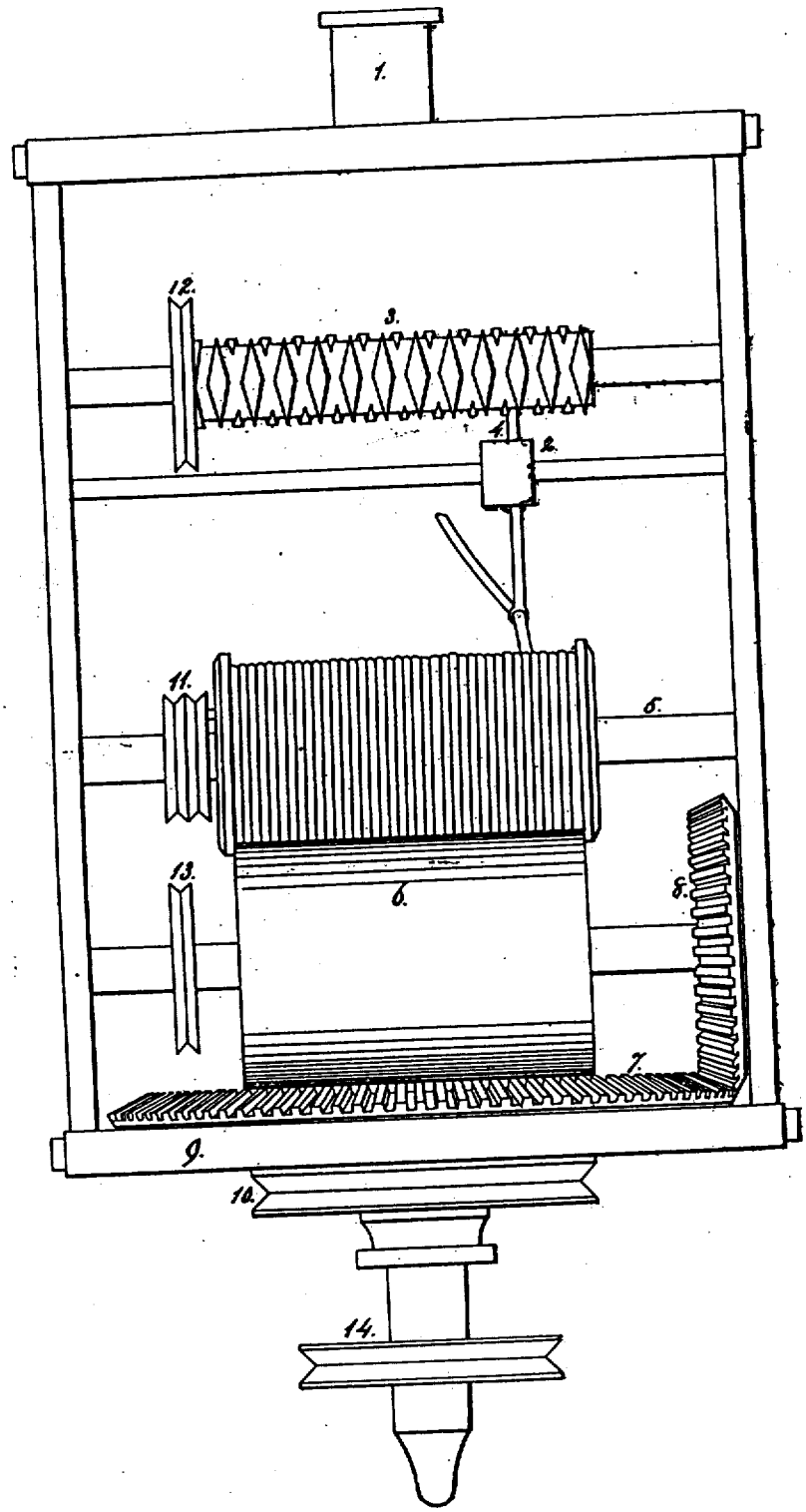
H. PETERS, PHOTO-LITHOGRAPHER, WASHINGTON, D. C.

Sheet 2. 2 Sheets.
8148½X
J. Chester.
Rope Mach.
Patented Apr. 16, 1834.
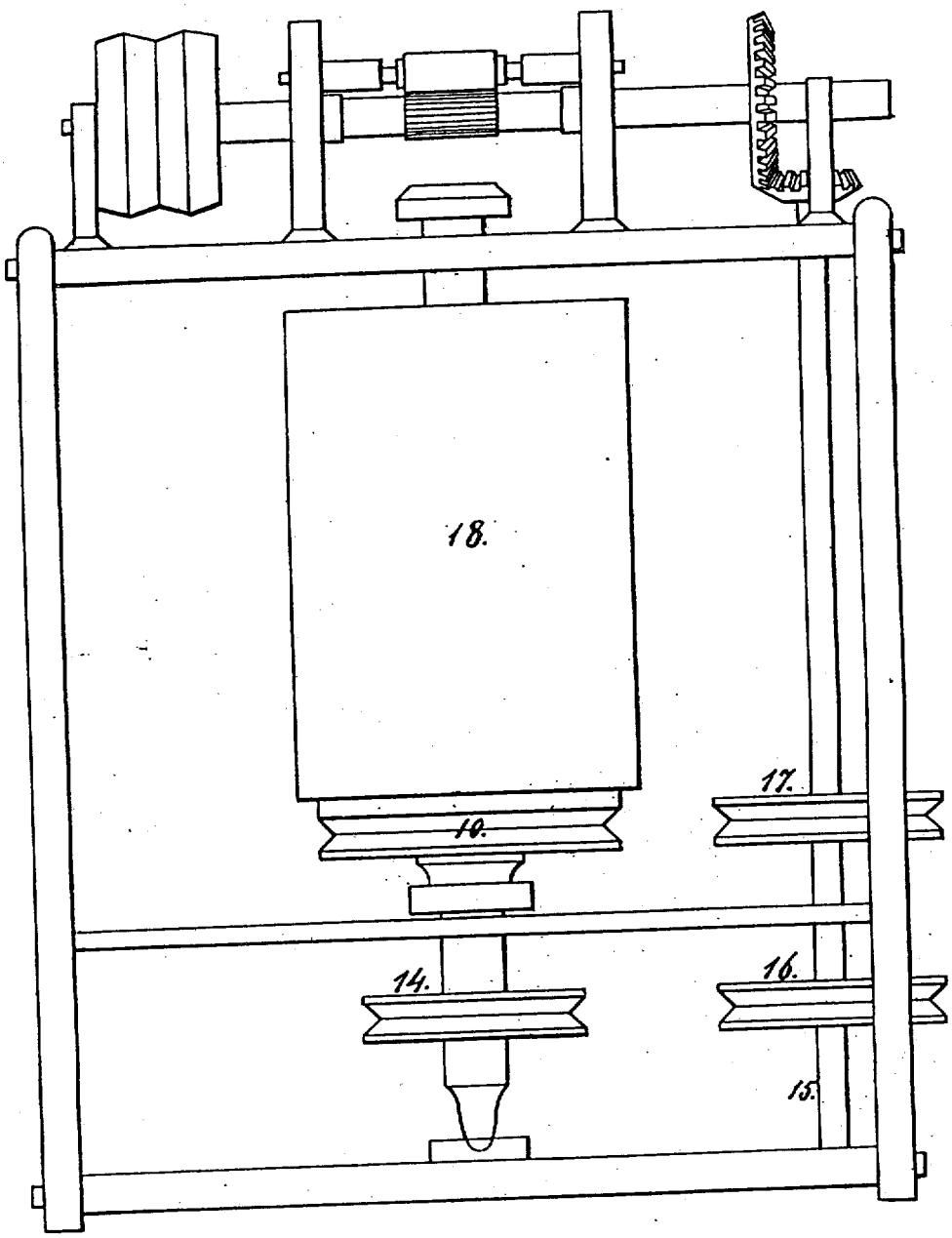
N. PETERS, PHOTO-LITHOGRAPHER, WASHINGTON, D. C.

Apl. 16. 1834 8148½X93

James Chesters of Cumberland Co of Providence St. of Rhode-Island & Providence Plantations Letters Patent The schedule referred to in these Letters Patent and making part of the same, containing a description of the said James Chesters him-self, of his improvement in the manufacturing of Cotton roping & spinning of cotton Yarn —

To all to whom these presents may come:

Be it known, that I. James Chesters of Cumberland in the county of Providence & State of Rhode Island & Providence Plantations have invented a new and useful improvement, in the manufacturing of cotton roping and spinning of cotton yarn, and that the following is a full and exact description of the construction & operation of said machine as improved by me No. 1. is the tube where the roping enters first from the rollers 2. is the traverse motion - No 3. right and left handled screw. 4. Pointer which plays within spaces of the screw - 5. Spindle that goes thro' the bobbin .. 6. Roller that turns the bobbin 7 & 8 Pair of bevel gears that convey motion to the roller - 9. a frame that is a bearing for all that is above described & revolves by means of pulley No 10. to twist the roping - No 11. driving pulley for No 12. No 13 Loose pulley to regulate the tightness of the band that plays over pulleys N. 11. 12. 13. ... 14. Spindle & pulley that give motion to all inside the frame or flyer. 15. 16. 17. A shaft & two driving pulleys to drive the spindles in the machine - Any number of spindles can be put in a machine 18. a revolving case to avoid the imperfection of revolving in the air for the purpose of saving power - The machine above described is called a double re-volving speeder, I ask for Letters Patent to be granted, founded upon the application to the above machine of the loose pulley No 13. which regulates the tightness of the band that plays over pulleys 11. 12. 13. also of the application to the above machine of the right and left handed screw No 3. and the revolving case No 18. which encloses the Drawing

8148½ X machinery numbered as follows 1.2.3.4.5.6.7.8.9 — 11.12.13. the pulley the right and left handed screw and the revolving case being necessary to carry into effect the principle of the improvement—

Witnesses
William Cook
Christopher Robinson.

James Chesters 468 words d Wgl.